United States Patent [19]

Dunlay et al.

[11] Patent Number: 5,052,661
[45] Date of Patent: Oct. 1, 1991

[54] CONTROLLING HEAT TREATING FURNACES

[75] Inventors: Mark J. Dunlay, Evansville, Ind.; James G. Baker, Owensville, Ky.

[73] Assignee: Aluminum Company of America, Pittsburgh, Pa.

[21] Appl. No.: 478,826

[22] Filed: Feb. 12, 1990

Related U.S. Application Data

[63] Continuation-in-part of Ser. No. 348,413, May 8, 1989, abandoned.

[51] Int. Cl.⁵ ............................................ C21D 11/00
[52] U.S. Cl. ..................................... 266/87; 148/128; 374/126; 266/100
[58] Field of Search ..................... 266/87, 100, 80, 78; 374/125, 126; 148/129, 128

[56] References Cited

U.S. PATENT DOCUMENTS

| | | | |
|---|---|---|---|
| 2,232,594 | 2/1941 | Dike | 73/355 |
| 2,275,265 | 3/1942 | Mead | 374/125 |
| 3,020,745 | 2/1962 | Sielicki | 374/126 |
| 3,504,524 | 4/1970 | Maley | 374/126 |
| 4,408,903 | 10/1983 | Baldasarri | 374/126 |
| 4,611,930 | 9/1986 | Stein | 374/126 |

OTHER PUBLICATIONS

Rucklidge, A Beginner's Guide to Infra-Red Thermometers, 12/1979.

Primary Examiner—S. Kastler
Attorney, Agent, or Firm—Elroy Strickland

[57] ABSTRACT

A method and apparatus for determining the correct temperature of a heated coil of sheet material and for using said measurement to control a heat treating furnace. The method includes providing a spot of heat resistant material having a known and constant emissivity that is substantially unity on an uneven edge of the coil, the material of the spot remaining on peaks of the uneven edge. The constant emissivity of the spot is independent of that of the edge, the emissivity of which changes and indicates a temperature is substantially different from the true temperature of the edge. The coil is heated and the spot emits infrared energy in an amount that is substantially representative of the correct temperature of the coil and edge. This infrared energy is sensed by an infrared detector aimed at the spot, the output of the energy being indicative of the true temperature of the edge and of the coil mass after it attains the temperature of the edge.

8 Claims, 3 Drawing Sheets

CONTROLLING HEAT TREATING FURNACES

This application is a continuation-in-part of patent application Ser. No. 07/348,413, filed May 8, 1989 now abandoned.

BACKGROUND OF THE INVENTION

The present invention relates to heat treating coils of metal sheet in furnaces

Coiled sheets of metal are customarily annealed in batches in batch-type furnaces. Such annealing involves placing several large coils on a suitable carrier and disposing the carrier with the coils in the furnace. The coils are heated to a desired annealing temperature, usually between 650° and 900° F., in the case of aluminum, and allowed to soak for an interval of several hours to effect the desired anneal in the mass of each coil and thus in the product readied for shipment to customers. Annealing is required because of the work hardening that occurs when the sheet of the coil is rolled in the process of reducing its thickness, i.e., the sheet is worked hardened to a degree requiring it to be softened for further working or shaping.

Over the years, the size of aluminum coils supplied to the container industry, for example, have become increasingly large. The width of the sheet that makes up the coil can be as large as sixty three inches, with an outside diameter of ninety inches. The weight of such a coil is about 50,000 pounds. The container industry requires that the coiled material be partially annealed so that the container forming process can be effected with maximum ease, which occurs on a mass production basis. This requires close control of the metallurgical properties of the material of the coil, and these properties are obtained by heat treating coils for a period of time and in a controlled manner to effect such properties.

Measuring the surface temperature of heated workpieces after they have been heated for a time period sufficient to allow uniformity of temperature throughout the masses of the workpieces, can be accomplished by the use of thermocouples inserted into the workpiece surfaces. Such a procedure is shown and described in U.S. Pat. No. 3,447,790 to Ross et al. This requires the drilling of holes in the workpiece to receive the thermocouples.

In the case of the large coils discussed above, the thermocouples are inserted into the edges of the wraps of sheet material that form each coil so that the temperature measured by the thermocouples will be closer to the center of the mass of the coil, i.e., the heat of the furnace atmosphere begins at the outer sides or edges of the coil and migrates into the wraps of the coil until the coil mass is heated.

Wires are then strung between the thermocouples and instruments for reading the electrical output of the thermocouples, the electrical output being indicative of workpiece temperature. It can be appreciated that such a procedure is slow and labor intensive and requires, in addition, the damaging of the edges of each coil. Further, the failure rate of thermocouples can be high. It can further be appreciated that in production facilities where time is an important parameter in reducing unit costs and increasing profits, the attachment of thermocouples to workpieces is not a desirable way to determine and monitor workpiece temperature.

Another method of measuring surface temperature is the use of infrared sensing devices, which devices do not contact (and damage) the workpiece but rather receive heat that is radiated from a heated surface. These devices, however, have had major weaknesses, particularly in measuring the temperature of aluminum workpieces, because of the low and changing emissivity constant of aluminum surfaces. Such emissivity causes errors in the readings of infrared detectors. Additional error is associated with radiation that is redirected from furnace walls to the detectors.

The emissivity of an aluminum surface is also a problem in infrared measuring. Emissivity is related to incident radiation, i.e., radiation that is reflected by a body, by the equation $E+R=1$. When emissivity E is unity, reflectivity R is zero, the emitted energy being directly related to true surface temperature. However, non-perfect radiators, such as heated aluminum surfaces, are partial reflectors of radiation such that their emissivity is always less than unity. Hence, the total energy leaving an area of such a body will, in general, not provide a reading of true surface temperature unless its emissivity is determined beforehand and an appropriate correction applied.

What is generally known as a "black body" and a perfect radiator is characterized by the fact that the energy which the black body and radiator emits depends only upon its absolute temperature. (The perfect radiator is called "black" because of the color [wavelength] that the human eye perceives in the visible spectrum; as explained hereinafter, the perfect radiator in the infrared spectrum is not necessarily "black".)

A non-black or gray body radiator emits then only a fraction of the energy emitted by a perfect radiator, the fraction being dependent on the "emissivity" of the body surface. Thus, in order to relate energy emitted by a non-perfect radiator to true temperature, the prior art has either had to provide means to compensate for the emissivity of the non-perfect or gray radiator or use a coating of black body material on the workpiece. U.S. Pat. No. 4,465,382 to Iuchi et al and U.S. Pat. No. 4,659,234 to Brouwer et al are examples of the compensating method, while U.S. Pat. No. 4,408,903 to Baldasarri and a paper entitled "A Beginner's Guide to Infra-Red Thermometers" by J. M. Rucklidge (Land Instruments, Inc. 1979) disclose the second method.

SUMMARY OF THE INVENTION

The present invention is directed to a method of repeatably determining the correct temperature of heated coils of aluminum sheet that radiate infrared energy in relatively limited and changing amounts, i.e., in amounts substantially less than the amount of energy representative of the correct temperature of each coil, and uses this determination to control heat within a furnace containing the coils, and thus the heat of the coils, to effect desired metallurgical properties in the masses of the coils.

It is an objective of the invention to optimize annealing time of coils weighing up to 50,000 pounds and thereby reduce annealing time by twenty to forty percent, annealing time being on the order of twelve to twenty-four hours.

It is another objective of the invention to sense the true temperature of uneven edges of the coils, the uneven edges being formed by wraps of coil material when the coil is formed.

The above method and objectives are accomplished by providing a spot of heat resistant material on the uneven edge of a coil, the material having a constant and given, known emissivity, and thus an emissivity that is independent of the emissivity of the coil edge, when heated, such that the spot emits infrared energy in an amount that is substantially representative of the correct temperature of the edge. The spot is placed on the edge or side of the coil and not on the outer wrap of the coil, i.e., even though the wraps of the coil are tightly wound, the interfaces of the wraps tend to insulate and interrupt the transfer of heat from the outermost wraps to the innermost wraps.

In addition, the material of the spot is one that does not migrate into the interstices of the wraps so that when the metallurgical processes of the heated coils are completed, the spot is easily removed. Customers of the coils require the coils to be free of foreign substances. And, because the edges of a coil formed from sheet that has been rolled are sharply uneven, the material of the spot tends to remain on the outer peaks of the edges. The valleys of the edges behind the peaks and behind the spot tend to remain bare.

An infrared sensor can now be mounted in the furnace wall and aimed (angled) at the spot to view only spot material and not uncoated metal of the coil edge behind the spot. By receiving only the energy emitted from the spot, the sensor provides an output representative of correct edge temperature, as well as the correct temperature of the mass of coil after the mass has attained the temperature of the spot and edge.

The size of the spot need only be sufficient to allow viewing by the sensor, i.e., the spot need only be slightly larger than the viewing area provided by an optics of the sensor.

Further, infrared sensors are not sensitive to changes in distance between the sensor and coil edge, i.e., infrared sensors are commercially available that provide means to automatically compensate for different sensing distances. For this reason, the coils need not be placed in the identical lateral location relative to the sensor each time a new batch of coils is disposed in the furnace.

The invention, in addition, locates the infrared detector in a sight tube that extends into the furnace and aims the detector at the spot of constant emissivity. The end of the sight tube in the furnace has a flange that shields the detector from radiation reflected from the walls of the furnace. The walls of the tube and the shield are cooled so they themselves do not form a source of heat to be sensed by the detector. In this manner, the detector receives only the radiation emitted by the spot, which has high emissivity, so that the spot does not reflect energy. A reading of spot and substrate temperature is thus provided that is the correct or substantially correct temperature of the substrate.

Utilization of the above technique(s) has allowed the present inventors to realize an improvement of 300% (minimum) in temperature measurement accuracy versus the conventional methods described above.

THE DRAWINGS

The invention, along with its advantages and objectives, will be better understood from reading the following detailed description in connection with the accompanying drawings in which.

PREFERRED EMBODIMENTS

Figure 1:
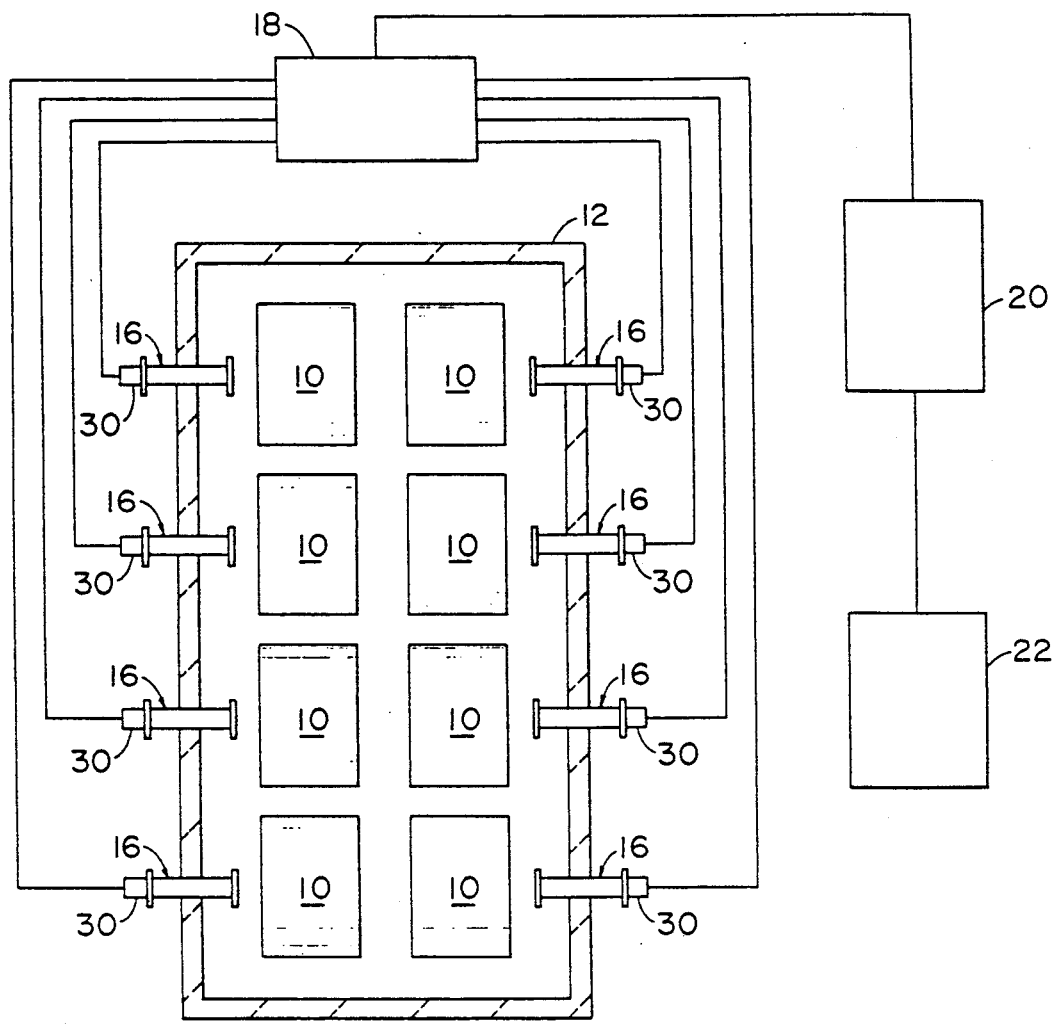
FIG. 1 is a plan view of eight coils of sheet metal material located in a batch-type annealing furnace, and eight sight containing infrared detectors.
Figure 2:
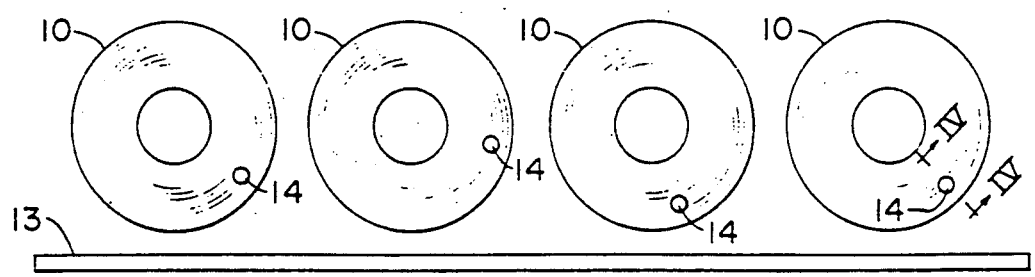
FIG. 2 is a side elevation view of four of the eight coils of FIG. 1, the sides or edges of which are provided with a spot of material having a known, constant emissivity.

Referring now to FIG. 1 of the drawings, eight coils 10 of sheet metal material are shown located in a furnace 12 for simultaneously annealing the coils. The coils are supported on suitable pallet or other type of carrier 13, only schematically represented in FIG. 2. After coils 10 are placed in furnace 12 the furnace is sealed from the atmosphere outside of the furnace and the atmosphere within the furnace is then heated and controlled in a prescribed manner, i.e., in the manner of the invention, which first brings the temperature of the coils to within an annealing range of temperatures, and then controls furnace temperature over the period of time necessary to complete the annealing process in the shortest time possible.

The annealing of large coils requires an extensive period of time in order to first bring the sidewalls of the coils to an annealing temperature, then maintain sidewall temperature for a soaking time that allows the mass of each coil to reach the temperature of its sidewalls. The masses are then reduced in temperature over a period of time necessary to effect final desired metallurgical properties in the coil material. Heretofore, to insure such a result, the coils were kept in the furnace and at annealing and soaking temperatures for a period of time in substantial excess of the time actually needed to complete the process. Such excess time is costly, as it reduces the output of the annealing process, and uses additional fuel or electrical power to maintain heat during the excess time.

A way to obtain true temperature measurements, as explained earlier, is to locate thermocouples in the coils. The present invention avoids the use of thermocouples by employing infrared detecting arrangement assemblies 16 (described in detail hereafter) that receives and senses only the radiation emitted from spots 14 (FIG. 2), located on the edges of coils 10, each spot being a layer of material of a constant and known or given emissivity that is preferably near unity so that the temperature seen and read by 16 is the true temperature of the coil.

Several materials tested successfully in providing the constant, given emissivity for the layer of spot 14, the materials being resistant to the heat of an annealing furnace. A material that has been found to be particularly good for depositing on the edge of a large coil of aluminum sheet is a small amount of carbon provided by an acetylene torch. It is believed that the carbon-hydrogen bond ($C_2H_2$) of the torch plasma, as it is deposited on the workpiece surface, provides a given high emissivity for infrared sensing. In addition, the carbon of the torch does not "bleed" into the spaces between the wraps of the coil (even though the wraps are tightly wound, most liquids tend to enter between the wraps) so that all of the carbon is easily removed when the edges of the coil undergo a trimming operation. Further, an acetylene torch is easy to use, requires little time to make the deposit, and is therefore a low cost procedure.

The carbon provides an emissivity that is relatively high such that the energy emitted by it when the supporting substrate is heated is representative of the temperature of the substrate. When the emissivity of a substance used for spots 14 is not substantially high but is constant and known, the instruments of infrared detectors 30, as part of assembly arrangements 16, can be adjusted to compensate for the difference between the true temperature of the substrate and that presented by the instrument.

Referring again to FIG. 1 of the drawings, eight assemblies 16 for guiding and sensing infrared energy are mounted in the wall of furnace 12 at fixed locations opposite spots 14 (FIG. 2) provided on the edges of eight coils 10 facing the assemblies. Assemblies 16 include detector instruments 30 that read the respective temperatures of the spots, and thus of the edges of the coils, as described in detail hereinafter, and output electrical signals to a process control computer 18. The computer tracks the output of each instrument, and thus the temperature of each coil, within the furnace at a given time. The computer then instructs electronic devices 20 that are connected to control individual burners or electrical resistance heaters (represented schematically by box 22 in FIG. 1) that heat respective portions or regions within the furnace. Heating zones within the furnace are thus, in effect, sensed and controlled, as the spots and coils are located in respective portions of the furnace.

Figure 3:
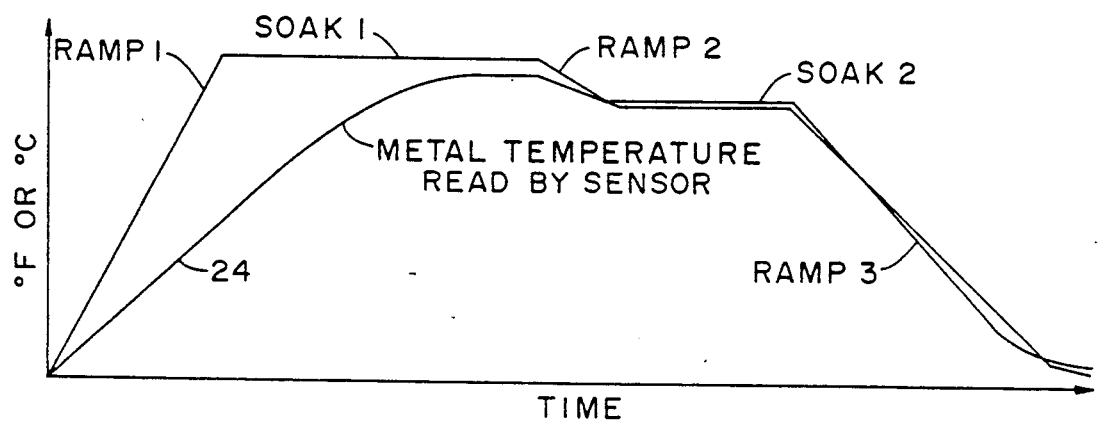
FIG. 3 is a graph depicting a heat cycle for annealing large coils of aluminum sheet in the furnace of FIG. 1 using controls effected by an infrared sensor and sight tube arrangement of the invention.

A heating process of the invention is graphically depicted in FIG. 3 of the drawings, using the above control devices and instrumentation. After the coils are disposed in furnace 12 and the furnace closed to the ambient outside of the furnace, computer 18 is programmed to energize the heat sources of the furnace in the process of ramping up the temperature of the atmosphere within the furnace. In FIG. 3, this initial ramping is labeled "ramp 1". After a time sufficient to bring the mass of the coils to an annealing temperature, the coils are "soaked" at this temperature which, in FIG. 3, is labeled "soak 1". As shown by a curve 24 in FIG. 3, which curve represents the temperatures of the coil masses, as they are heated in the furnace, the heat of the masses lags behind ramp 1 and soak 1 temperatures of the furnace atmosphere, as the masses of the coils requires a certain period of time to acquire the temperature of the furnace atmosphere. The sensors 30 of 16 read the temperatures of the coil edges, and control the heat sources of the furnace in a manner that insures that edge temperature does not exceed the ramp and soaking temperatures. In this manner, no portion of the coil will be overheated while undergoing annealing to ensure proper metallurgical properties at the edge and in the mass of the coil.

After the masses of the coils obtain the edge temperature, computer 18 is programmed to begin a decrease in the temperature of the furnace (ramp 2 in FIG. 3) to a second soaking temperature (soak 2) which is somewhat less than that of the first soaking temperature. Again, the temperatures of the coil edges and mass are not allowed to exceed ramp and soak temperatures.

Finally, after the soak at the lower temperature over a period of time, the computer orders the heat sources to ramp down (ramp 3) to an approximate room temperature, the masses of the coils now having attained the desired metallurgical properties.

Because of the closeness of the control effected by the sensors and the control electronics, the period of time for effecting proper annealing can be substantially reduced. In one batch of eight coils, each coil weighing on the order of 45,000 pounds, the coils attained proper anneal and metallurgical properties in 8.5 hours, which is a thirty percent reduction over normal annealing time for such coils. The reason for this is that the margin of error in the system of the invention is small, i.e., on the order of two percent, whereas a simple use of available infrared detectors, without a proper sight arrangement, presently to be explained, can have as much as forty percent error in reading edge temperature.

Figure 4:
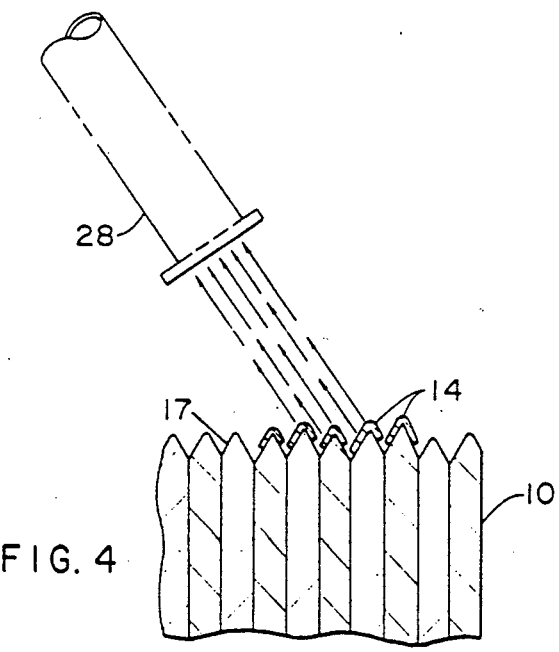
FIG. 4 is a greatly enlarged sectional view of the portion a coil containing a spot of high emissivity material taken along lines IV—IV in FIG. 2, the sheet of the coil having been subjected to a cold rolling operation.

FIG. 4 of the drawings is a partial section of a coil of cold rolled aluminum sheet having a thickness on the order of 0.013 inches. The section is greatly enlarged to show the unevenness of coiled edges formed by wraps 17 of the coiled sheet. The spot 14 of low emissivity material is shown as layers (greatly exaggerated) located on the outer peaks of the edge, while the inner valleys of the edge remain without the spot material. If sensors 30 see the inner valleys of the edge, they will, of course, see bare metal. Such metal, as explained above, has a low and changing emissivity that provides large errors in measuring edge temperature. On the other hand, if sensor assembly 16 is disposed at an appropriate angle, it will see only the high emissivity material 14. The reading of the temperature by sensor 30 will then be an essentially correct temperature of the coil edge. Bare aluminum, for example, generally has an emissivity of 0.45 to 0.55, whereas the emissivities of spots 14 are on the order of 0.92 to 0.94.

Figure 5:
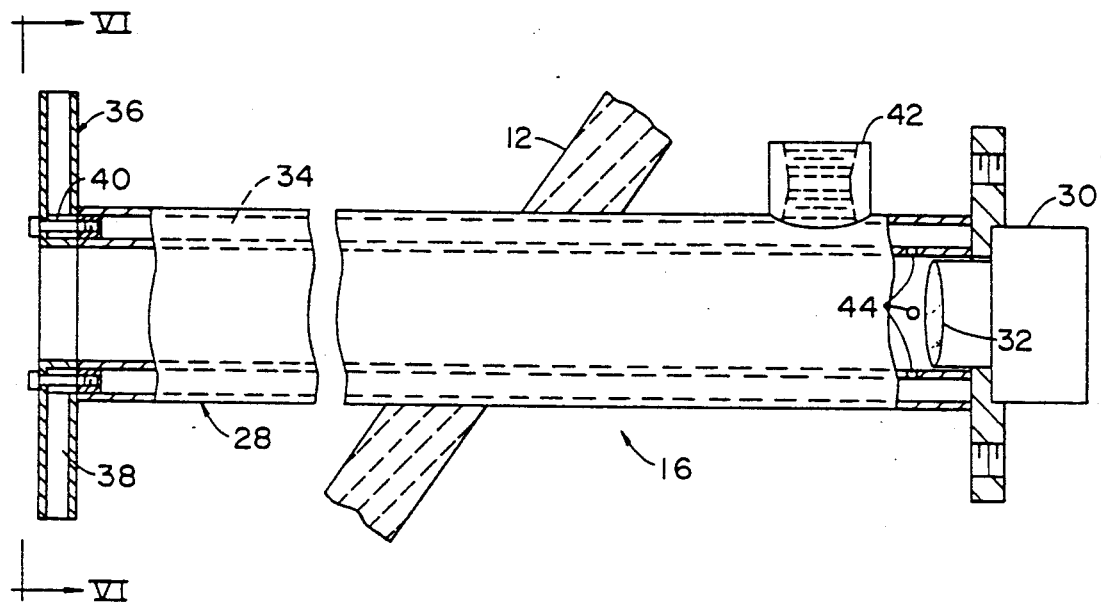
FIG. 5 is a side elevation view of the sight tube of the invention.
Figure 6:
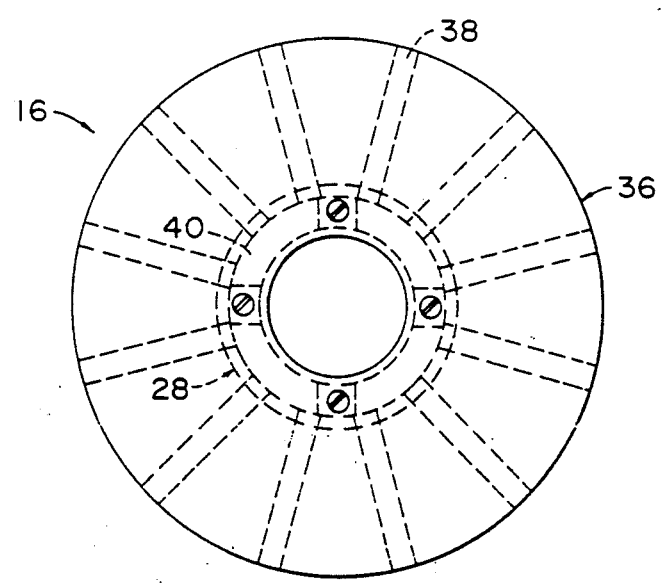
FIG. 6 is an elevation view of the end of the sight tube of FIG. 4.

FIGS. 5 and 6 of the drawings show assemblies 16 mounted and secured in the wall of furnace 12 for receiving infrared radiation emitted by one of the spots 14, and for providing a measurement of the true temperature the coil 10 containing the spot. More particularly, 16 includes a tube 28 for sighting and aiming a heat sensitive detector and instrument 30, located at the end of the tube remote from the interior of the furnace.

In FIG. 5, tube 28 is shown angled relative to furnace wall 12 so that the sight angle of the tube is directed at the layer of spot material 14 located on the peaks of the coil edges and not at the bare, uncoated material in the valleys of the coil edge. This is shown somewhat schematically in FIG. 4. In FIG. 4, the energy leaving the coil edge is that energy emitted by the layers of spot material 14 only, so that the energy entering tube 28 and reaching the sensor in detector 30 is that of the high emissivity material. In this manner, the sensor reads a much truer indication of coil temperature than that provided by the bare metal behind the spot material. The angle of tube 28 shown in FIGS. 4 and 5 is illustrated only, i.e., the sight angle for the tube will be that angle which provides an optimum reception of infrared energy by detecting instrument 30 from spot 14.

Detecting instrument 30 is only diagrammatically depicted in FIG. 5, and is of type generally commercially available for sensing infrared energy emitted by heated metal surfaces. The instrument includes a heat sensor (not shown) that is an integral part of associated detector electronics (not otherwise shown) that receives and amplifies sensor output, and presents the same in the form of a signal voltage that represents the temperature of the surface being read. This output is directed to computer 18.

A lens 32 is shown in FIG. 5 as an integral part of instrument 30. The lens is representative of the optics generally employed to focus emitted energy to the sensor within detector 30.

Tube 28 is formed of a hollow wall structure 34. The hollow wall of the tube extends from the general location of detector 30 to the opposite end of the tube, which is located within furnace 12 and reasonably close to the coil edge. The furnace end of the tube includes a flange 36 having passageways 38 connected in fluid communication with the hollow wall 34 of the tube. As shown in FIG. 6, the flange can be disc shaped, with twelve radially extending passageways 38. The passageways extend from a manifold 40, located within the flange and inwardly of the periphery of the flange, to the periphery of the flange. There, the passageways open into the interior of the furnace. Manifold 40 connects passageways 38 to the hollow wall of tube 28.

Flange 36 is located a suitable distance within furnace 12 from the furnace wall. This distance is sufficient to have flange 36 function to shield detector 30 from infrared energy re-radiated from the furnace walls by increasing the angle at which the radiation can enter tube 28 and thus the optical path of detector 30. Such re-radiated energy is a source of error, as the detector output is a measurement of all infrared energy it receives. Further, by cooling the tube and flange, the detector "sees" only the heat of spot 14.

As seen in FIG. 5 of the drawing, tube 28 is provided with a coupling 42 connected to the hollow wall 34 of the tube at a location adjacent to and in front of detector 30. Coupling 42 is used to supply an inert coolant gas to hollow wall 34 and to flange 36 to provide the above cooling of the tube and flange. The gas flows through the hollow wall of the tube to manifold 40 of flange 36. From the manifold, the flow of the gas is divided as it travels to and through multiple passageways 38 of the flange. The gas exits into the furnace interior.

By maintaining the tube and flange in a relatively cool condition relative to the ambient temperature and atmosphere in the furnace, detector 30 does not receive and measure the heat of the tube and flange. Rather, with tube 28 sighted on heated spot 14, and on the peaks of the coil containing spot material, the energy radiated from the spot is focused on the detector by optics in detector 30. The detector receives and measures essentially only the heat energy radiated from the spot. As discussed earlier, incident radiation from the walls of the furnace is shielded from the detector by flange 36. As discussed earlier, the sight angle of tube 28 and the optics in detector 30 relative to the surface of the spot is one that produces an optimum reception of infrared energy by detector 30.

The inner wall of sight tube 18 is shown provided with small openings 44, in FIG. 5, in front of and closely adjacent to detector 30. When the coolant is directed to the hollow wall of tube 28 from coupling 42, a small portion of the flow, i.e., on the order of one percent, flows through openings 44 to purge the interior or bore of tube 18 in front of detector 30 of substances and contaminates that might be in the bore and that might obstruct of the "sight" of the detector and thus its ability to receive the infrared energy from spot 14. The bore of tube 28 is purged by the coolant flowing through openings 44, into and through the bore, and to and from the end of the tube located in the furnace.

The material of tube 28 and flange 36 is one that can withstand the temperature attained in the furnace in which the tube and flange must operate. Steel has been found suitable for most furnaces employed to heat treat aluminum coils.

With the above apparatus, as thus far described, and in combination with a spot of material having a known constant emissivity, repeatable, reproducible and accurate measurements of coil temperatures are made without the use of thermocouples, and hence without making any physical contact with the coils. And since accurate temperatures are needed for proper heat treatment, any excess furnace time to insure proper treatment is not necessary. This increases production of annealed coils so that unit costs are reduced.

Further, since an accurate measurement of temperature is now available from detector 30, the output of the detector is employed to accurately control the temperature of the furnace and respective regions within the furnace, and thus accurately control the temperatures of the coil masses being heated. Further, with precise control of heat input to a furnace, savings in fuel or electrical power are effected.

While the invention has been described in terms of preferred embodiments, the claims appended hereto are intended to encompass all embodiments which fall within the spirit of the invention.

What is claimed is:

1. A method of controlling the metallurgical properties of low emissivity coils of multiple wraps of aluminum alloy material in a batch type furnace to effect desired metallurgical properties in the multiple wraps of the coils, said wraps forming an uneven, non-planar edge surface, the method comprising:
   applying a spot of heat resistant material of a constant, known emissivity, which emissivity of each coil and in a manner that does not penetrate into the intersticis of the coil wraps, and which leaves edge portions adjacent said spots uncoated with the known emissivity material,
   placing the coils in the furnace,
   heating the atmosphere within the furnace,
   aiming infrared sensors at said spots through cooled sigh tubes from locations remote from the coil edges and spots to sense the temperatures of the spots of known emissivity material,
   using the temperature of said spots, as sensed by the sensors, to control the temperature of the atmosphere within the furnace and thereby control coil temperatures in a process of metallurgically controlling the properties of the coils, and
   thereafter continuing to use the temperature of the spots sensed by the sensors to complete the process of metallurgically controlling the properties of the coils by controlling the temperature within the furnace until the masses of the coils exhibit the desired metallurgical properties.

2. The method of claim 1 including
   disposing the sight tube at an angle to the coil edge that limits the view of the sensor to that of the spot of heat resistant material.

3. The method of claim 1 in which the spot of the heat resistant material is provided by depositing a spot of carbon material on the coil edge.

4. The method of claim 3 in which the spot of carbon material is deposited by an acetylene torch.

5. The method of claim 1 in which the sight tube is provided with a flange to prevent radiation from the walls of the furnace from reaching the sensor, the method including the step of cooling said flange.

6. The method of claim 5 in which the tube and flange are cooled by directing a coolant through hollow wall portions of the tube and flange.

7. A method of controlling the metallurgical properties of low emissivity coils of multiple wraps of aluminum sheet material in a batch type furnace to effect desired metallurgical properties in the wraps of the coils, said wraps forming an uneven, non-planar edge, the method comprising:

applying a spot of heat resistant material of a constant, known emissivity that is substantially unity to the uneven edge of each coil and in a manner that does not penetrate into the wraps of the coils, and leaves inner portions of the uneven edge behind the spots uncoated with the heat resistant material, placing the coils within the furnace, heating the atmosphere within the furnace, aiming infrared sensors at said spots through sight tubes from locations remote from the coil edges and spots, and at an angle that views only the material of said spots to sense the temperatures thereof, cooling the sight tubes and a flange of each tube located within the furnace, using the temperatures sensed by the sensors to raise the temperature of the atmosphere within the furnace and thereby raise the coils to a temperature that will begin the process of metallurgically changing the properties of the coils, and thereafter continuing to use said temperature to complete the process of metallurgically changing the properties of the coils by controlling the temperature of the furnace until the masses of the coils have the desired metallurgical properties.

8. Apparatus for controlling the metallurgical properties of low emissivity coils of multiple wraps of aluminum material in a batch type furnace to effect desired metallurgical properties in the wraps of the coils, said wraps forming an uneven, non-planar edge surface, the apparatus comprising:

at least one infrared sensor, at least one sight tube located in a wall of the furnace such that one end of the tube is located within the furnace while the other end is located outside of the furnace, said sensor being located in the tube adjacent the outside end thereof and thus remote from the coils, and disposed at an angle that permits the sensor to view only a spot of heat resistant material having a constant, known emissivity that is substantially unity located on a portion of the non-planar edge of the coil, a flange located adjacent the end of the sight tube located within the furnace, said tube and flange having hollow walls for conducting a coolant therethrough, means for controlling the temperature within the furnace, and means for electrically connecting the infrared sensor to said means for controlling furnace temperature.

* * * * *

UNITED STATES PATENT AND TRADEMARK OFFICE
CERTIFICATE OF CORRECTION

PATENT NO. : 5,052,661

DATED : October 1, 1991

INVENTOR(S) : Mark J. Dunlay and James G. Baker

It is certified that error appears in the above-identified patent and that said Letters Patent is hereby corrected as shown below:

Col. 8, line 38   After "which emissivity" insert --is substantially unity, to edge portions--.

Col. 8, line 46   Change "sigh" to --sight--.

Signed and Sealed this

Ninth Day of February, 1993

Attest:

STEPHEN G. KUNIN

Attesting Officer   Acting Commissioner of Patents and Trademarks